United States Patent [19]

Grimaud et al.

[11] 4,381,350

[45] Apr. 26, 1983

[54] PROCESS FOR THE PREPARATION OF HIGH DENSITY ION EXCHANGE RESINS AND ION EXCHANGE RESINS THUS OBTAINED

[75] Inventors: Edouard Grimaud, Courbevoie; Maurice Troussier, Pierre Benite, both of France

[73] Assignee: Uranium Pechiney Ugine Kuhlmann, Paris, France

[21] Appl. No.: 97,335

[22] Filed: Nov. 26, 1979

[51] Int. Cl.³ .......................... C08F 8/20; B01J 41/08
[52] U.S. Cl. ...................................... 521/31; 525/356
[58] Field of Search ........................... 521/31; 525/356

[56] References Cited

U.S. PATENT DOCUMENTS 2,801,223  7/1957  Greer ................................... 525/356
3,009,906  11/1961  Eichhorn et al. ................... 525/356

FOREIGN PATENT DOCUMENTS 2740534  3/1979  Fed. Rep. of Germany ...... 525/356
765165  2/1978  South Africa .
767216  5/1978  South Africa .
778761  7/1957  United Kingdom ............... 525/356

OTHER PUBLICATIONS

Derwent Pubs. Ltd., Permutit Ltd., 26218B/14, 29/03/1979.

Primary Examiner—William F. Hamrock
Assistant Examiner—Peter F. Kulkosky
Attorney, Agent, or Firm—McDougall, Hersh & Scott

[57] ABSTRACT

A process for obtaining a dense ion-exchange anionic resin and the product so obtained. The resin is of the type based on a co-polymer of styrene and divinylbenzene. The process involves a liquid phase treatment comprising contacting the resin with bromide in a liquid phase and simultaneously charging the liquid phase with gaseous chlorine while in contact with the resin for reaction to provide a styrene divinylbenzene copolymer ion-exchange anionic resin containing bromine and chlorine groups.

8 Claims, No Drawings

PROCESS FOR THE PREPARATION OF HIGH DENSITY ION EXCHANGE RESINS AND ION EXCHANGE RESINS THUS OBTAINED

The present invention relates to a process for the densification of ion exchange resins, and more specifically anion resins by simultaneous treatment with bromine and chlorine. It also relates to the densified resins obtained.

The ion exchange resins are solid resins bearing ionic group which, in a liquid medium, are able to exchange the ions which they contain for the ions present in the medium. These exchange reactions are reversible and the resins can recover their initial ionic form by a suitable treatment.

The most widely used ion exchange resins are constituted by cross-linked copolymers of styrene and divinylbenzene in which the ion exchange groups have been fixed by chemical reaction.

These resins are generally present in the form of beads of varying granulometry, the diameter of these beads usually being between 0.3 and 1.2 mm.

The resins are known as "gel" if they are not porous or only slightly porous. They are called "macroporous" if they have a high porosity.

The resins can either be cation resins or anion resins.

The cation resins bearing sulphonic, carboxylic or phosphonic groups are able to exchange the cations.

The anion resins bearing quaternary ammonium or amine groups are able to exchange the anions.

One of the oldest and still significant applications of ion exchange resins is in the treatment of water which can either be merely softened by exchange of the calcium ions which it contains for sodium ions, or can be completely deionised by double exchange with replacement of the cations by hydrogen ions and replacement of the anions by hydroxyl ions.

However, the ion exchange resins are used more and more widely nowadays in chemical processes and more particularly in purification and concentration processes. Thus, the ion exchange resins serve to eliminate certain undesirable ionic impurities from acids, bases, salts or organic compounds. The resins also serve to fix, concentrate and isolate the ionic species present in very dilute form in liquid media.

A treatment with ion exchange resin is generally carried out in a column which is filled with resin and traversed by a stream of liquid to be extracted, this stream usually being directed from top to bottom.

However, for certain applications it is preferable or even compulsory for the liquid stream to traverse the resin bed from bottom to top.

This is the case, in particular, with the resin treatment of a liquid charged with fine solid particles whose granulometry is much lower than that of the beads of resin. If the liquid charged with solid particles traverses the resin bed from top to bottom, these particles will be stopped by the beads piled up on the resin bed which will be blocked fairly quickly. On the other hand, if the liquid charged is admitted through the bottom of the column at such a flow rate that the resin is slightly fluidised by the rising stream of liquid, the fine solid particles will traverse the resin bed without difficulty and will be eliminated at the top of the column at the same time as the treated liquid in which they will be entrained.

A process of this type which allows work directly on a liquid charged with fine solid particles is of great interest because it avoids the need to clarify completely, before treatment over an exchange resin, a liquor which would naturally contain solids in finely divided form. It has been examined for the extraction of elements dissolved in the ore attacking pulps and more particularly in uranium hydrometallurgy.

However, for a process of this type to function satisfactorily, it is obviously necessary for the resin beads, while allowing the fine particles suspended in the liquid to pass, not to be entrained out of the column themselves or flattened against a retaining grid at the top of the column, under the influence of the rising stream of liquid to be extracted. In the latter case, the same risks of blockage would occur as when the stream is directed from top to bottom.

The phenomenon of entrainment of the resin beads by a rising liquid stream occurs when the rising speed of this stream exceeds the speed at which the resin beads normally settle in the medium.

It is known that the settling speed of a sphere in a liquid medium is:

(a) proportional to the square of the diameter of the sphere and to the difference in density between the sphere and the liquid medium.

(b) inversely proportional to the viscosity of the medium.

This ideal law applying to a sphere falling in a liquid also applies, at least in a first approximation, to a resin bed composed of substantially spherical beads which is expanding under the influence of a rising stream of liquid.

Since the liquid to be treated is of a given density and traverses a resin bed from bottom to top at a given speed, the higher the granulometry and the density of the beads constituting the resin bed, the less tendency they will have to be entrained.

With regard to the size of the resin beads, the highest granulometry commercially available is the so-called "16-20 mesh", which means that the diameter of the beads in the moist state in their normal presentation is substantially between 0.8 and 1.2 mm. It should be noted that even if resins of higher granulometry could easily be produced, which is not the case, such resins would undoubtedly be of little interest because the resin exchange reactions are solid-liquid reactions and the practical performance of the resins, in conjunction with the rate of exchange, would diminish very rapidly in the case of much higher granulometries.

The density of commercial resins, which are virtually all based on copolymers of styrene and divinylbenzene, is of the order of 1.3 maximum for the cation resins in their sodium form and remains below 1.2 for anion resins in their chloride form.

These densities, and more particularly that of the anion resins, are too low for the development of certain applications such as the treatment in a rising stream, of liquors charged with fine solid particles originating from the attack of ores.

It is therefore quite desirable and, in certain cases, essential to be provided with ion exchange resins having a density which is higher than those of the commercially available resins.

A few earlier patents relate to the preparation of ion exchange resins having a density which is higher than that of the current commercial resins.

American Pat. No. 2,809,943, filed on Sept. 11, 1952 by the company Dow Chemical describes resins containing in finely divided form a mineral charge such as zirconium silicate, which makes them heavier. This charge is used in the first stage of the synthesis of the resins, that is to say during copolymerisation of the styrene and divinylbenzene the charged copolymers obtained in bead form serving as a support for the exchange groups formed during the following stages of synthesis.

German Patent Application No. 2,218,126, filed on Apr. 14, 1972 by the company "Permutit A. G." describes the preparation of dense ion exchange resins using a styrene halide during the preparation of the macromolecular matrix, the exchange group support.

French Patent Application No. 2,362,886, filed on Aug. 26, 1977 (South African priority of Aug. 27, 1976) by the South African organisation "National Institute for Metallurgy" also describes the preparation of dense halogenated resins, but the halogen atoms are introduced by bromination or iodination in an intermediate stage in the synthesis of the resin while the macromolecular skeleton already exists but the exchange groups are not yet formed.

It is difficult to know the exact value of the dense resins just described which do not seem to have been developed industrially yet, but, whatever their qualities, they have a major disadvantage since they have to be specially manufactured, at least in part. Now it is known that the manufacture of ion exchange resins and, more particularly, that of anion exchange resins is awkward. It demands strict monitoring and necessitates large precautions in terms of safety, and this explains the obviously high cost of ion exchange resins.

It therefore appears very desirable, in order to provide exchange resins which are denser than normal, not to have to synthesize new resins more or less completely but to start from normal commercial exchange resins which are readily available on the market and to make them denser by a suitable treatment. One method of obtaining this result would be to fix some bromine on the resin. However, bromination with bromine did not seem to allow significant densification of strong anion resins which are of particular interest for use in processes for extracting dissolved elements (fairly complex heavy anions) present in the ore-attacking pulps.

Now it has been observed, and this forms the subject of the invention, that commercial anion resins could be densified considerably without significantly impairing their exchange characteristics by treating them simultaneously with bromine and chlorine. This treatment causes the fixation on the resin of chlorine, but also and particularly of bromine which, in view of its high atomic weight, constitutes the essential factor in the densification achieved.

The simultaneous treatment of resins by bromine and chlorine forming the subject of the present invention can be carried out either in a liquid phase or in a vapour phase.

In the so-called liquid phase treatment, the solid resin which is present in the form of beads is placed in some liquid bromine or in a solution of bromine in an organic solvent or a mixture of organic solvents, and some gaseous chlorine is bubbled into this medium. If one or more organic solvents are used, halogenated solvents and, more specifically, chlorinated solvents are preferred. Gentle stirring of the resin in the liquid medium promotes the homogeneity of the reaction. With regard to the treatment temperature, the only limitation is the one associated with the boiling temperature of bromine (59° C.) and of the solvents possibly used. The duration of the treatment is linked essentially with the densification which is to be achieved and with the operating conditions adopted, moreover. The treatment can last from 15 minutes to more than 12 hours. In fact, the duration of the treatment is usually between 30 minutes and 4 hours.

In the so-called vapour phase treatment, the solid resin in the form of dry or moist beads is subjected to the simultaneous action of bromine and chlorine vapour. It is possible to obtain a mixture of gaseous bromine and chlorine vapour, optionally with the formation of chlorine bromine, by bubbling some chlorine into the liquid bromine and entraining the said mixture into contact with the resin by means of an air or inert gas stream. However, according to the preferred variation of the process, some gaseous chlorine and bromine vapour are charged simultaneously onto the resin, the bromine vapour being formed and entrained by air or an inert gas such as nitrogen bubbling into the liquid bromine. This variation has the advantage of allowing the flow of chlorine to be controlled separately from that of bromine which depends on the temperature of the liquid bromine and on the flow of air or inert gas which is bubbled into it. The bromine vapour and gaseous chlorine can either traverse a fixed resin bed or can merely pass into contact with the mass of resin. In the latter case, gentle stirring of this mass is desirable to homogenize the reaction. During the treatment, the reactor containing the resin is kept at a temperature of between 0° and 100° C. and preferably between 40° and 80° C. The treatment can last from 1 hour to more than 24 hours, but it is preferably between 4 and 16 hours. The weight of bromine used generally represents from 1 to 4 times that of the resin to be treated, in dry form, and the weight of chlorine used represents from 25 to 100% of the weight of the bromine.

The vapour phase process has the advantage over the liquid phase process of not causing significant physical degradation of the resin. In fact, the liquid phase process can cause marked physical degradation of this resin to various degrees, depending on the conditions adopted and the exact nature of the resin treated. This degradation is interpreted by the presence of a larger proportion of fissured or broken beads in the treated resin than in the initial resin.

The densification process by the simultaneous action of bromine and chlorine forming the subject of the present invention allows anion resins having a density of between 1.150 and 1.175 (density of the dry resin in its ionic chloride form) to be used as starting materials which end up as resins having densities which can exceed 1.30 and sometimes even 1.35 in the same ionic form. This gain in density is significant. In the above-mentioned French Patent No. 2,362,886, the densities of the anion resins prepared according to the process forming the subject of this patent vary between 1.20 and 1.26 (see Table 1, page 10 of French Pat. No. 2,362,886).

In the following examples, Examples 1 to 5 illustrate the lack of interest in monohalogenation and Examples 3 to 7 demonstrate the advantage of simultaneous halogenation with bromine and chlorine to obtain higher density resins.

EXAMPLE 1

The resin used is the Amberlite IRA 405 resin made by the company Rohm & Haas. It is a strong anion resin prepared from a copolymer of styrene and divinylbenzene. This resin is of the gel type, that is to say is nonporous or very slightly porous. It bears $-[N(CH_3)_3]^+$ groups. It has a standard 20-50 mesh granulometry, that is to say that the diameter of the beads is between 0.38 and 0.45 mm. It is present in ionic chloride form.

A bromination test is carried out with the bromine in an aqueous medium.

50 g of moist resin are placed in a mixture of 150 g of water and 45 g of bromine and the reaction mixture is stirred at about 60° C. for 5 hours.

The resin is then separated, rinsed in water, treated with a decinormal soda solution to destroy the merely absorbed bromine, rinsed with water again, treated with a normal hydrochloric acid solution to put it back into its initial ionic form (chloride form) and rinsed again with alot of water. The water used is permuted water.

The resin is then dried for 24 hours under vacuum at 80° C. and its density is measured with the aid of liquid mixtures of toluene and carbon tetrachloride of increasing densities (1.150, 1.175, 1.200 etc) in which are placed a few beads of the resin under examination, and it is observed whether the beads sink or remain at the surface. The density of a resin can thus be located at about a given value or in a range of given values. According to this method, the density of the resin treated is about 1.20, whereas the density of the initial resin was within the range of from 1.150 to 1.175. The increase in density is very slight.

EXAMPLE 2

Still starting with the IRA 405 resin, a bromination test is carried out in a solution of bromine in carbon tetrachloride.

The reagents are as follows:
dry resin, chloride form: 50 g
bromine: 45 g
carbon tetrachloride: 150 g The treatment is carried out with stirring at 60° C. for 5 hours.

After rinsing in methanol, the resin is subjected to the same treatments as in Example 1 to free it from the merely absorbed bromine and to put it back into its initial ionic form.

As in Example 1, the treated resin has a density of about 1.20. The increase in density is therefore very slight again.

EXAMPLE 3

This test relates to the DOWEX 21K resin made by the company Dow Chemical. It is a strong anion resin of the gel type which bears $-[N(CH_3)_3]^+$ groups and is prepared from a copolymer of styrene and divinylbenzene. It is therefore of substantially the same nature as the IRA 405 Amberlite used in the preceding examples, but the sample of DOWEX resin used has a high granulometry of from 16 to 20 mesh, that is to say the diameter of the resin beads is between 0.8 and 1.2 mm.

The resin is treated with bromine dissolved in carbon tetrachloride under the conditions described in Example 2 except that the duration of the treatment is extended to 24 hours. The treatments to free the resin from the merely absorbed bromine and to put it back into its initial ionic form (chloride form) are the same as in the preceding examples.

The density of the initial resin was between 1.150 and 1.175 and that of the treated resin is within the range of from 1.200 to 1.225. Inspite of the duration of the treatment, the increase in density remains slight.

EXAMPLE 4

50 g of Amberlite IRA 405 resin having a 20 to 50 mesh granulometry (the same resin as used in Examples 1 and 2) is treated with a solution of 45 g of bromine in 150 g of carbon tetrachloride. This treatment is carried out at ambient temperature with stirring for 1 hour only, but gaseous chlorine is bubbled into the liquid medium throughout the treatment. The rate of flow of chlorine, measured at ordinary temperature and under normal pressure is 8 l/h.

The resin is then treated as in the preceding examples to free it from the merely absorbed halogens (bromine and chlorine) and to put it back into its initial ionic form (chloride form).

The density of the initial resin was between 1.150 and 1.175 and that of the treated resin is within the range of from 1.25 to 1.30.

In a much shorter treatment time than in the preceding examples and at a lower temperature, the gain in density obtained is much greater.

EXAMPLE 5

A test is carried out under the same conditions as in the preceding example, but the DOWEX 21K resin having a high, 16 to 20 mesh granulometry is used this time.

The same gain in density is obtained, but it is observed that the treated resin contains a large proportion of fissured or broken beads. This observation was not made in the preceding test using a much finer granulometry resin.

EXAMPLE 6

50 g of DOWEX 21K resin having a 16 to 20 mesh granulometry, in dry form, is placed into a reactor rotating at 5 rpm. This reactor, which is constituted by a 250 cm$^3$ glass flask rotating about an inclined axis, is immersed into a bath kept at 60° C.

Bromine vapour and gaseous chlorine are charged into this reactor simultaneously.

The bromine vapour is obtained by bubbling air into some liquid bromine kept at 45° C. The flow rate of air in the liquid bromine is controlled at 12 l/h for 1 hour and at 3 l/h for the following 7 hours. The total quantity of bromine used is between 100 and 110 g.

Some gaseous chlorine is simultaneously charged at a flow rate of 2 l/h (measured at ordinary temperature under normal pressure) for 8 hours. The quantity of chlorine used is of the order of 50 g.

The operation lasts 8 hours.

The gases containing the bromine and chlorine which are not absorbed on the resin and the hydrohalogenated acids formed are transmitted to the outlet of the reactor in a 30% soda solution which fixes the halogens and halogenated derivatives, allowing them to be recovered later on.

After treatment with the bromine and the chlorine under the conditions described above, the resin placed in a column is treated successively with a decinormal soda solution to eliminate the merely absorbed halogens, rinsed with permuted water, treated with a normal hydrochloric acid solution allowing the initial ionic form to be recovered (chloride form) and is rinsed in a large amount of permuted water. The resin is then dried for 24 hours at 80° C. under vacuum.

The resin treated in this way has a density of between 1.300 and 1.325, whereas its initial density was between 1.150 and 1.175.

The densified resin has not been subjected to physical deterioration insofar as the proportion of fissured or broken beads, which is very small, is substantially the same as in the untreated resin.

Some bromine and chlorine were added to the densified resin once it had been treated with soda to eliminate the chloride ions fixed on the resin in its normal ionic form and to replace them with hydroxyl ions. The bromine and chlorine contents are from 14 to 15% and from 5.0 to 5.5% respectively.

The exchange capacity, expressed in equivalents per liter of moist resin is of the same order for the densified resin as for the virgin resin (of the order of 1.2). This exchange capacity represents the quantity of chloride ions, expressed in gramme equivalents, which 1 liter of moist resin can fix.

EXAMPLE 7

A Duolite ES 113 resin having a 16 to 20 mesh granulometry which is marketed by the French Company DIA-PROSIM is used. It is a strong anion resin of the gel type which bears $-[N(CH_3)_3]^+$ groups and is prepared from a copolymer of styrene and divinylbenzene.

This resin is treated under exactly the same conditions as those described in the preceding example.

The density of the treated resin is between 1.350 and 1.375 compared with an initial density of between 1.150 and 1.175.

The treatment did not cause any substantial deterioration of the resin beads.

The exchange capacity of the treated resin is 1.3 equivalents per liter of moist resin. The initial resin led to the same result.

The halogen contents of the treated resin, examined in hydroxyl form, are 16% for the bromine and from 6.5 to 7% for the chlorine respectively.

We claim:

1. A process for increasing the density of an ion-exchange anionic resin based on a copolymer of styrene and divinylbenzene comprising in a liquid phase treatment, contacting the resin with bromine in a liquid phase and simultaneously charging the liquid phase with gaseous chlorine while in contact with the resin for reaction to provide a styrene-divinylbenzene copolymer ion-exchange anionic resin containing bromine and chlorine groups.

2. A process according to claim 1, characterised in that the anionic ion-exchange resin bears $-[N(CH_3)_3]^+$ groups.

3. A process according to claim 1, characterised in that the resin is treated with some liquid bromine or a solution of bromine in one or more organic solvents, gaseous chlorine being charged into the liquid medium during the treatment.

4. A process for increasing the density of an ion-exchange anionic resin based on a copolymer of styrene and divinylbenzene comprising, in a vapor phase treatment passing chlorine gas through bromine in a liquid phase and contacting the resin with a mixture of vapors therefrom for reaction to provide a styrene-divinylbenzene copolymer ion-exchange anionic resin containing bromine and chlorine groups.

5. A process for increasing the density of an ion-exchange anionic resin based on the copolymer of styrene and divinylbenzene comprising, in a vapor phase treatment, passing air or an inert gas through bromine in a liquid phase to provide bromine vapors, passing the bromine vapors with gaseous chlorine simultaneously into contact with the resin for reaction to provide a styrene-divinylbenzene copolymer, ion-exchange anionic resin containing bromine and chlorine groups.

6. A process according to claim 1, 4 or 5, characterised in that the reactor containing the resin is kept at a temperature between 40° and 80° C. for the entire duration of the treatment.

7. A process according to claim 1, 4 or 5, characterised in that the treatment lasts between 4 and 16 hours.

8. Ion-exchange resins having a density equal to or higher than 1.30 obtained according to claim 1, 4, or 5.

* * * * *